(12) United States Patent
Zilmer et al.

(10) Patent No.: US 8,202,114 B2
(45) Date of Patent: Jun. 19, 2012

(54) MOBILE PHONE CRADLE WITH THREE-POINT RETENTION OF PORTABLE ELECTRONIC DEVICE INSTALLED IN THE CRADLE

(75) Inventors: Matthew Zilmer, Upland, CA (US);
Shun-Cheng Hung, Taipei (TW);
Kai-Hung Wang, Taipei (TW);
Tsung-Hsun Wu, Taipei (TW);
Chih-Sheng Chu, Taipei County (TW)

(73) Assignee: Mitac International Corp., Kuei-Shan Hsiang, Tao-Yuan Hsien (TW)

( * ) Notice: Subject to any disclaimer, the term of this patent is extended or adjusted under 35 U.S.C. 154(b) by 19 days.

(21) Appl. No.: 12/909,841

(22) Filed: Oct. 22, 2010

(65) Prior Publication Data
US 2011/0143583 A1 Jun. 16, 2011

Related U.S. Application Data

(60) Provisional application No. 61/286,025, filed on Dec. 14, 2009.

(51) Int. Cl.
*H01R 13/60* (2006.01)
*H01R 13/66* (2006.01)

(52) U.S. Cl. .................................................. 439/529

(58) Field of Classification Search .................. 439/529, 439/366
See application file for complete search history.

(56) References Cited

U.S. PATENT DOCUMENTS

| 2005/0255895 A1* | 11/2005 | Lee et al. ........................ 455/573 |
| 2008/0142651 A1* | 6/2008 | Tomasini et al. .......... 248/176.1 |
| 2009/0140113 A1* | 6/2009 | Carnevali ................. 248/223.41 |
| 2009/0219436 A1 | 9/2009 | Overstreet |

FOREIGN PATENT DOCUMENTS

| DE | 201 19 783 U1 | 3/2002 |
| DE | 20 2005 002 590 U1 | 6/2005 |
| JP | 2001077899 A | 3/2001 |

* cited by examiner

*Primary Examiner* — Javaid Nasri
(74) *Attorney, Agent, or Firm* — Winston Hsu; Scott Margo

(57) ABSTRACT

A cradle for receiving a portable electronic device installed in the cradle includes a housing, a top clamp slidably installed in the housing for permitting the top clamp to move up and down in the housing, the top clamp securing a top of the portable electronic device when the portable electronic device is installed in the cradle, and the portable electronic device making contact with the housing at two or more points for securing the portable electronic device within the cradle, and a height-adjust release button installed on the housing for permitting the top clamp to be raised when the height-adjust release button is actuated.

17 Claims, 12 Drawing Sheets

MOBILE PHONE CRADLE WITH THREE-POINT RETENTION OF PORTABLE ELECTRONIC DEVICE INSTALLED IN THE CRADLE

CROSS REFERENCE TO RELATED APPLICATIONS

This application claims the benefit of U.S. Provisional Application No. 61/286,025, filed on Dec. 14, 2009 and entitled "Mobile phone cradle with three-point retention of portable electronic device installed in the cradle", the contents of which are incorporated herein by reference.

BACKGROUND OF THE INVENTION

1. Field of the Invention

The invention relates to a cradle for a portable electronic device, and more particularly, to a cradle with adjustable retaining devices for securely retaining a portable electronic device installed in the cradle with three-point retention.

2. Description of the Prior Art

With the increasing popularity and increasing processing power of portable electronic devices, users have begun to use these devices more than ever. One popular example of the portable electronic devices is mobile phones. A modern mobile phone, in addition to having the capability of making phone calls, can also act as a portable computing platform or navigation system, thereby making the mobile phone an extremely convenient device to carry with the user at all times.

When driving a vehicle, it is often convenient to mount the mobile phone in a cradle for positioning the mobile phone in a location that is easy to access and easy to read the display of the mobile phone. Therefore a cradle for holding the mobile phone has become a popular accessory, not only for mobile phones, but for other portable electronic devices as well.

However, the conventional cradle suffers from the drawbacks of not being adaptable enough to receive mobile phones with slightly different dimensions while at the same time retaining the mobile phone in the cradle securely. One notable problem is when a user installs a protective cover around the outer surface of the mobile phone. This protective cover, often having rubber material, increases the dimensions of the phone on all sides of the phone. Not only can this make the cradle unable to physically receive the mobile phone, but an electrical connector formed on the cradle may not be able to make proper contact with an electrical connector of the mobile phone due to the thickness of the protective cover. Therefore, there exists a need for an adaptable cradle that can overcome these problems with the prior art cradles.

SUMMARY OF THE INVENTION

It is therefore one of the primary objectives of the claimed invention to provide a cradle containing adjustable retaining devices for securely retaining a portable electronic device installed in the cradle with three-point retention.

According to an exemplary embodiment of the claimed invention, a cradle for receiving a portable electronic device installed in the cradle is disclosed. The cradle includes a housing, a top clamp slidably installed in the housing for permitting the top clamp to move up and down in the housing, the top clamp securing a top of the portable electronic device when the portable electronic device is installed in the cradle, and the portable electronic device making contact with the housing at two or more points for securing the portable electronic device within the cradle, and a height-adjust release button installed on the housing for permitting the top clamp to be raised when the height-adjust release button is actuated.

According to yet another exemplary embodiment of the claimed invention, a cradle for receiving a portable electronic device installed in the cradle is disclosed. The cradle includes a housing, a male electrical connector formed on the housing for receiving a female electrical connector of the portable electronic device and establishing electrical connection between the male electrical connector and the female electrical connector when the portable electronic device is mounted in the cradle, wherein a length with which the male electrical connector protrudes from the cradle is greater than a depth of the female electrical connector in the portable electronic device, wherein the portable electronic device makes contact with the housing at two or more points for securing the portable electronic device within the cradle.

It is an advantage that the cradle contains adjustable retaining devices for securely retaining a portable electronic device installed in the cradle with three-point retention. The cradle is adaptable enough to accommodate portable electronic devices of different dimensions while still retaining the portable electronic device in the cradle securely. The cradle can be used in conjunction with a variety of different types of portable electronic devices, such as mobile phones, personal navigation devices, personal digital assistants, and so on.

These and other objectives of the present invention will no doubt become obvious to those of ordinary skill in the art after reading the following detailed description of the preferred embodiment that is illustrated in the various figures and drawings.

DETAILED DESCRIPTION

The present invention provides a cradle for receiving a portable electronic device such as a mobile phone. The cradle is well suited for use in vehicles, when the user does not have the opportunity to hold the portable electronic device. The cradle can securely retain the portable electronic device in place with three-point retention. Moreover, the cradle is adaptable enough to accommodate portable electronic devices of different dimensions while still retaining the portable electronic device in the cradle securely. Although the following disclosure will repeatedly refer to the cradle being used in conjunction with a mobile phone, a variety of portable electronic devices can in fact be used.

Figure 1:
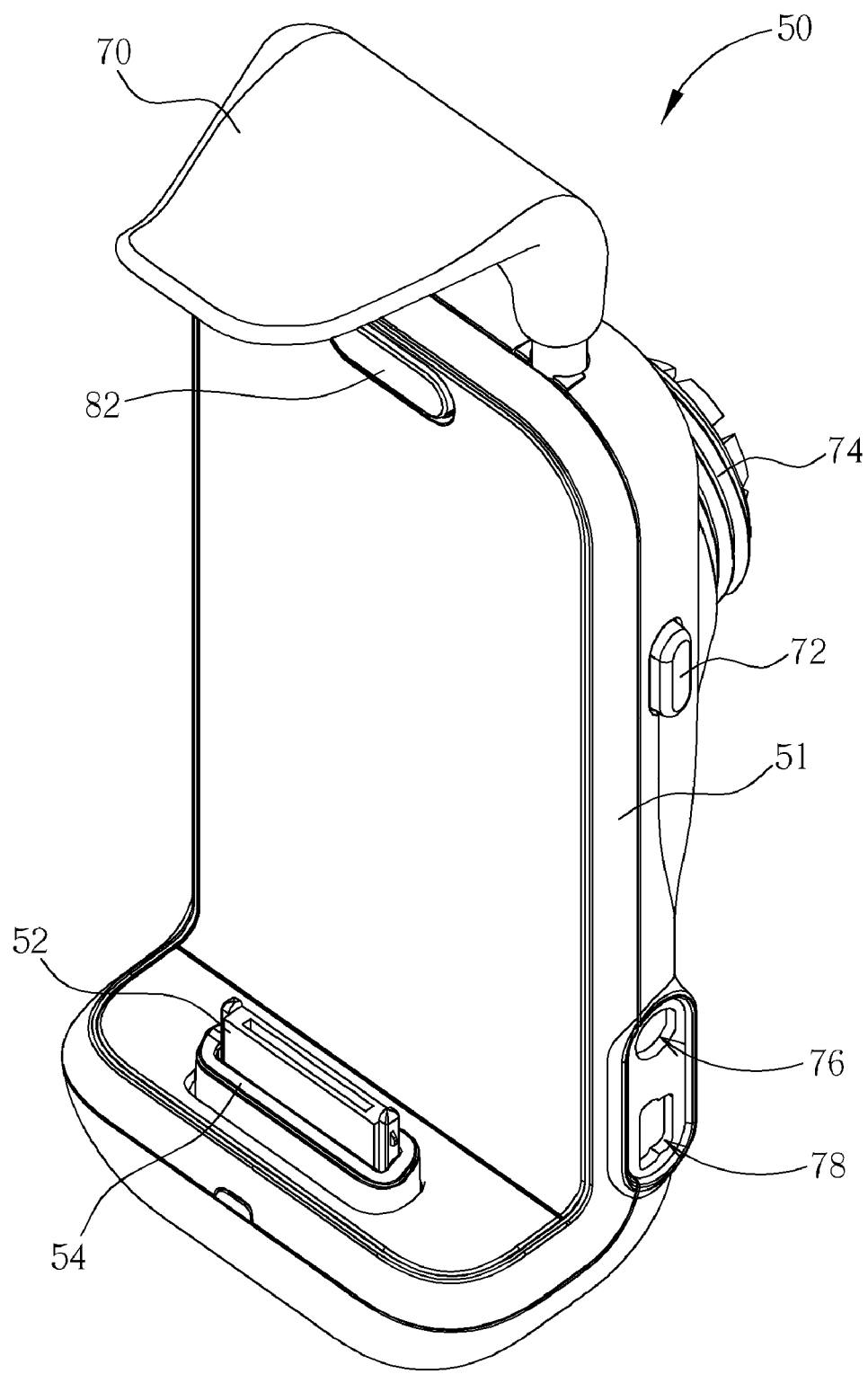
FIG. 1 is a top-front perspective view of the cradle according to the present invention.
Figure 2:
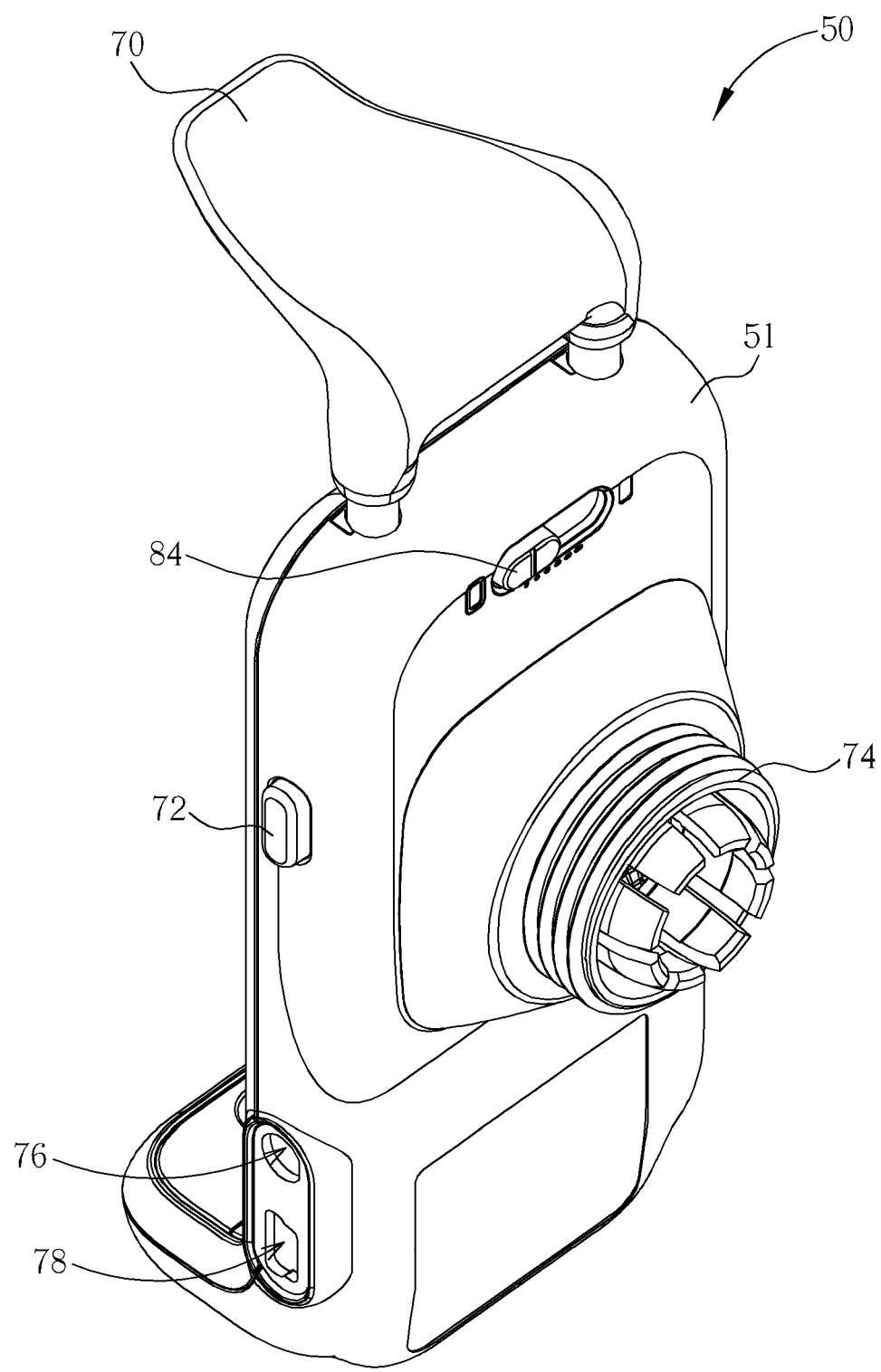
FIGS. 2-5 show a top-rear perspective view, a bottom-rear perspective view, a bottom-front perspective view, and a bottom view of the cradle, respectively.
Figure 3:
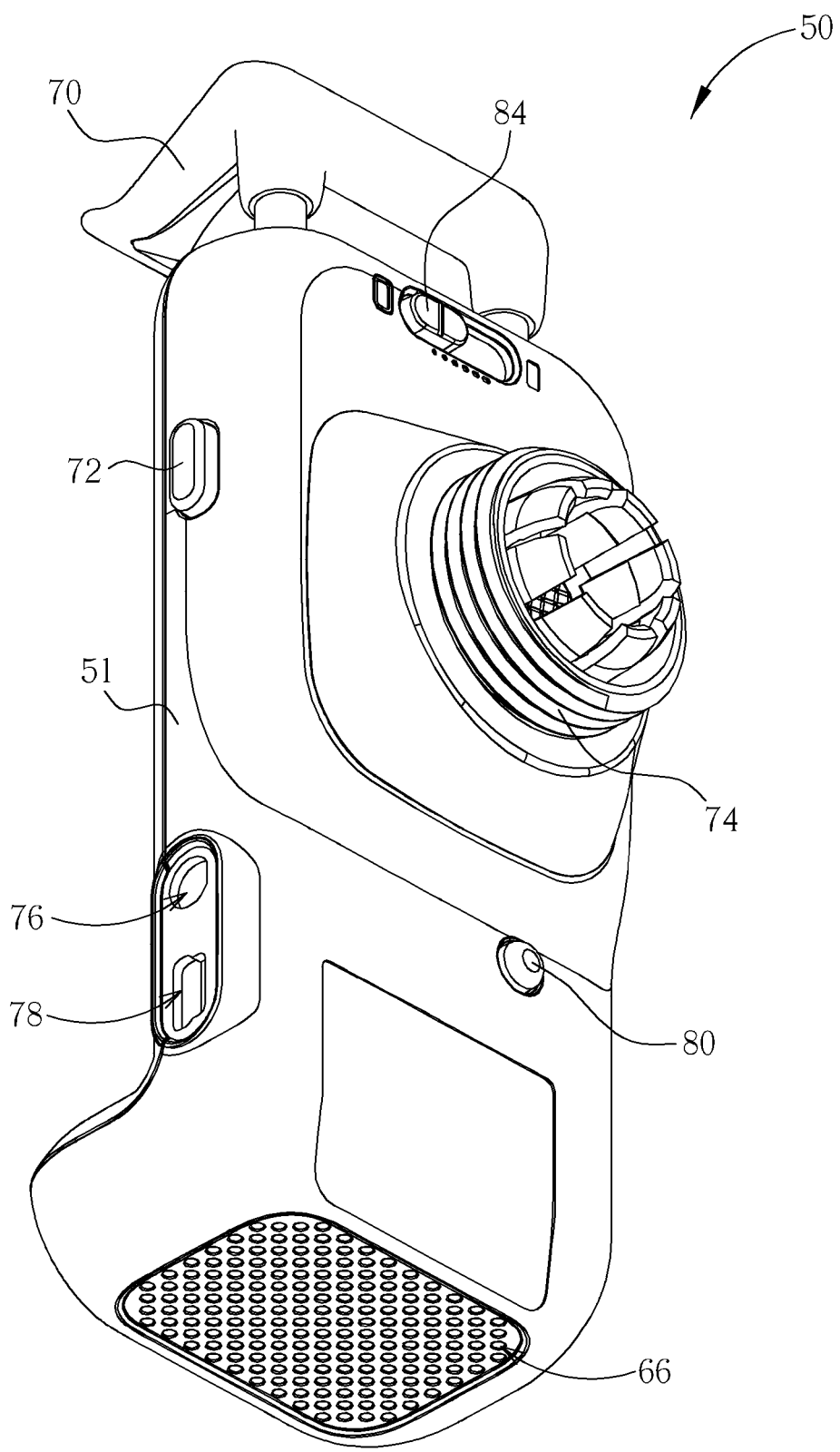
Figure 4:
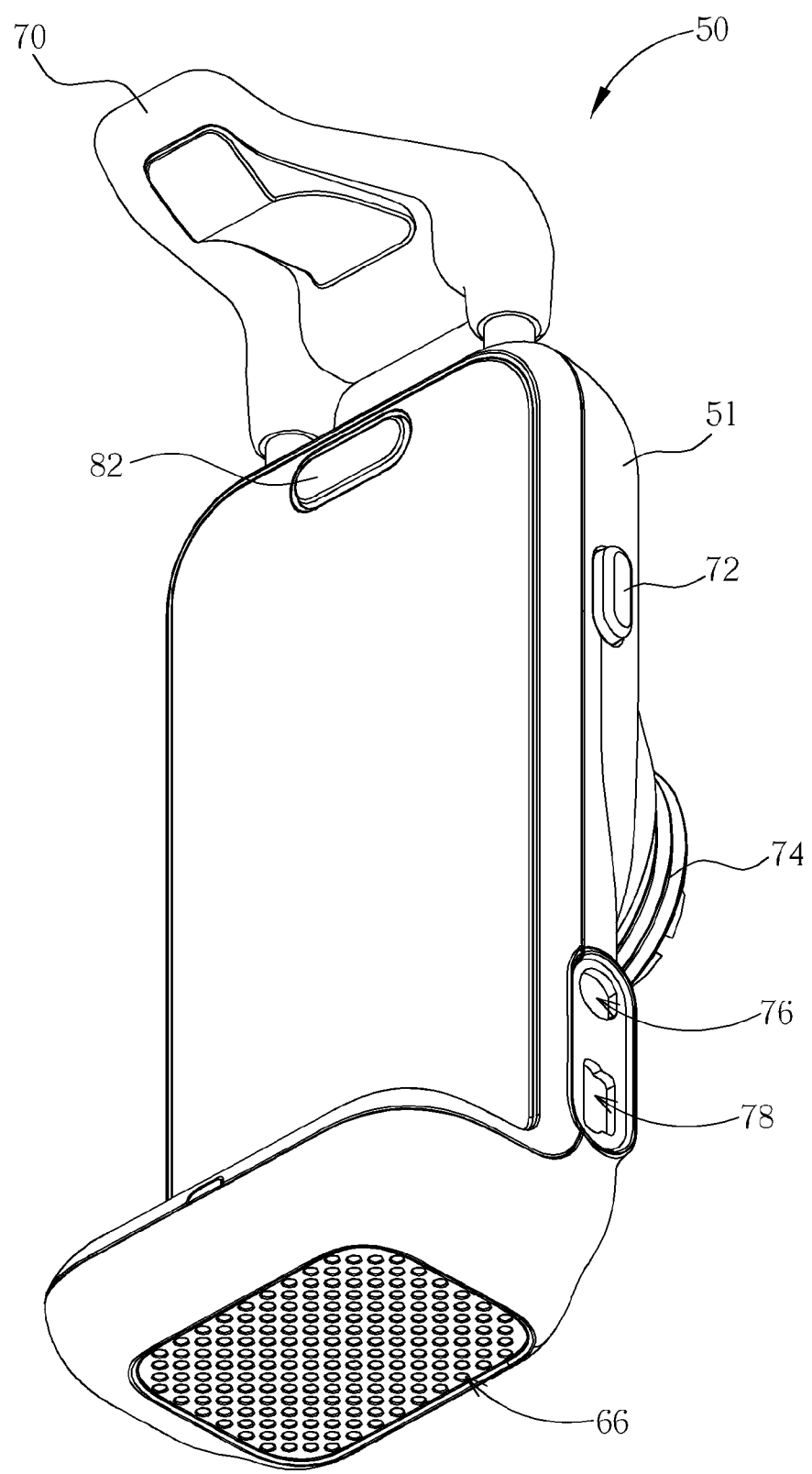
Figure 5:
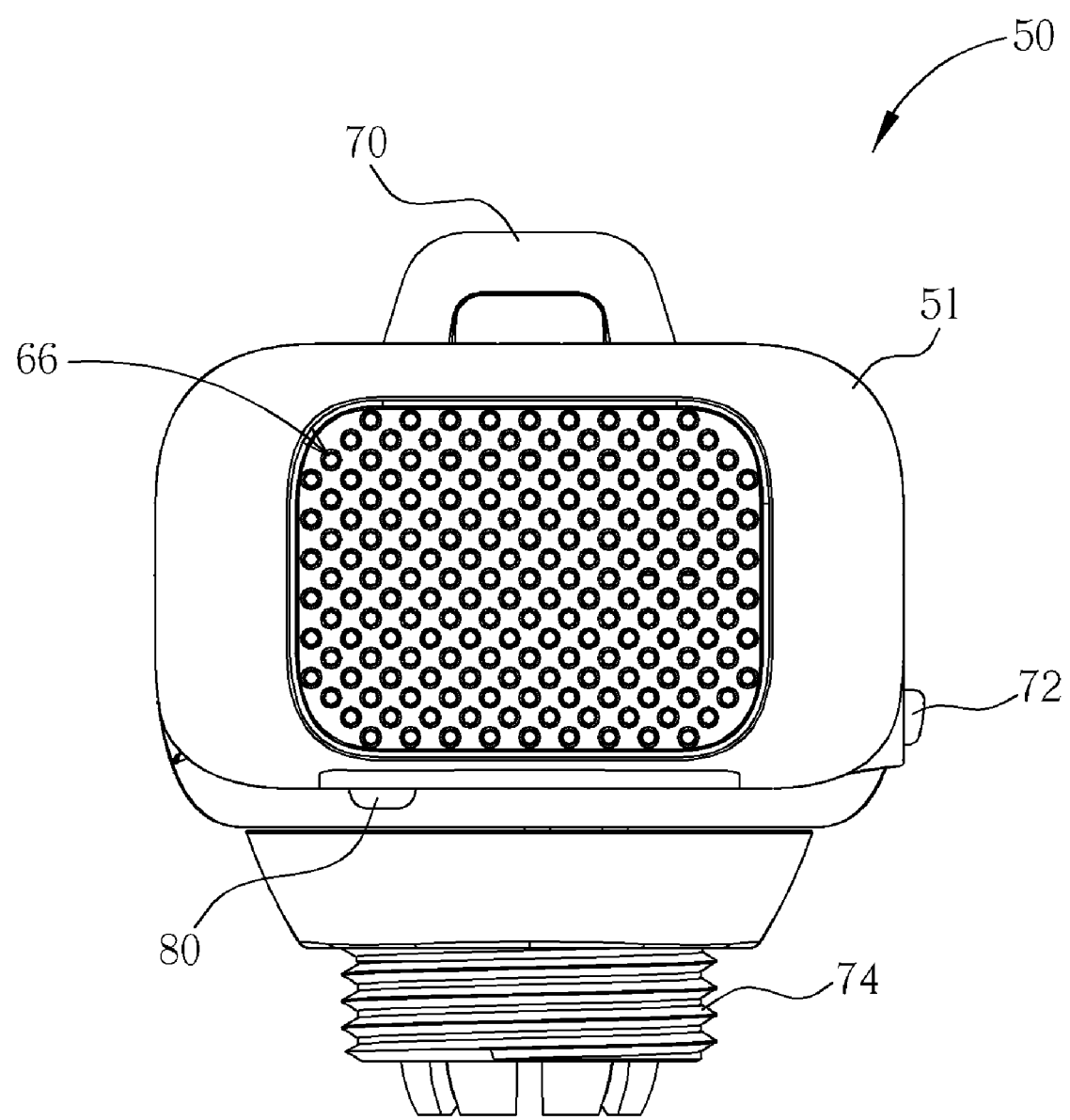
Figure 6:
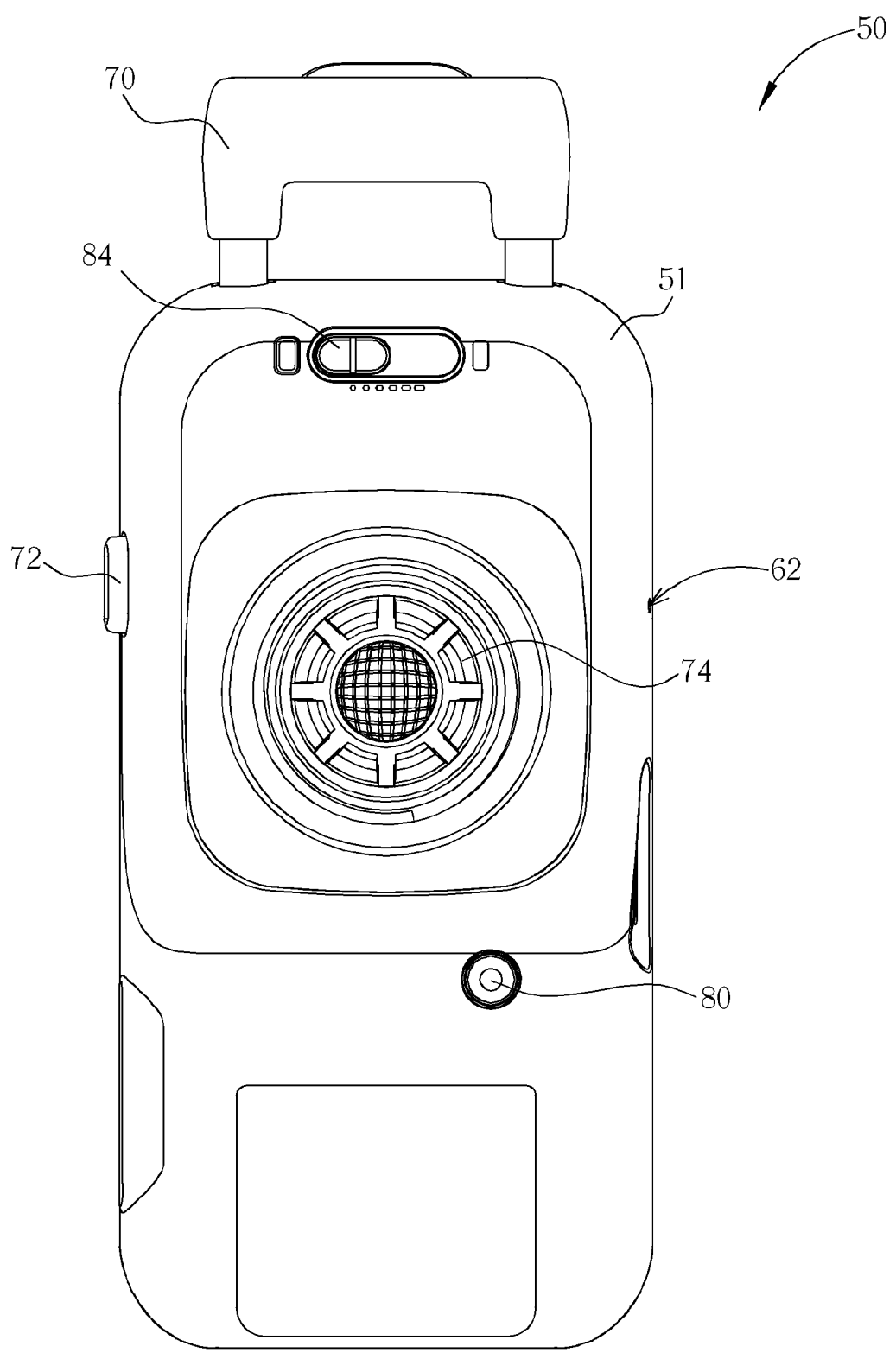
FIGS. 6-10 show a rear view, a right view, a front view, a left view, and a top view of the cradle, respectively.
Figure 7:
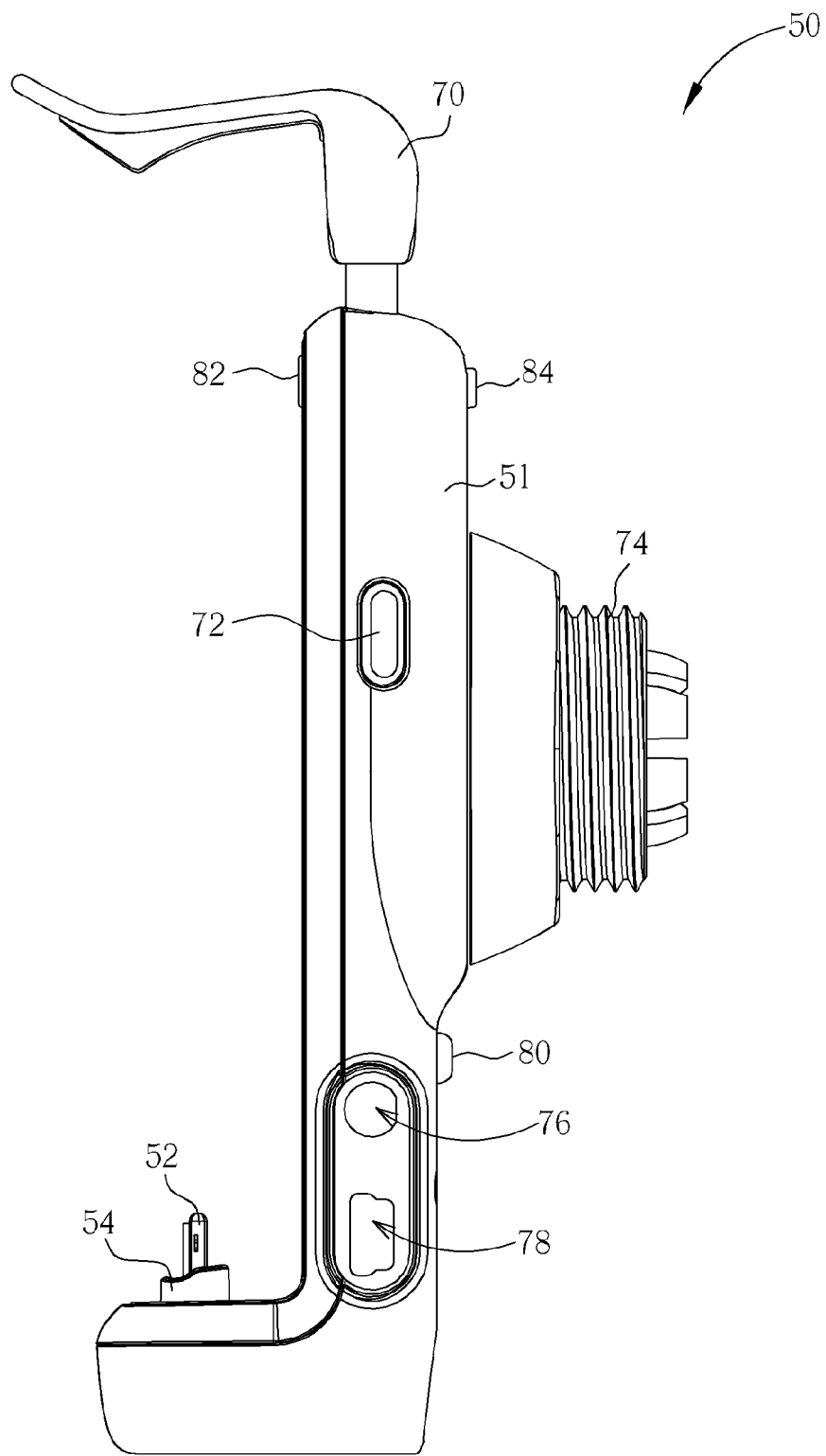
Figure 8:
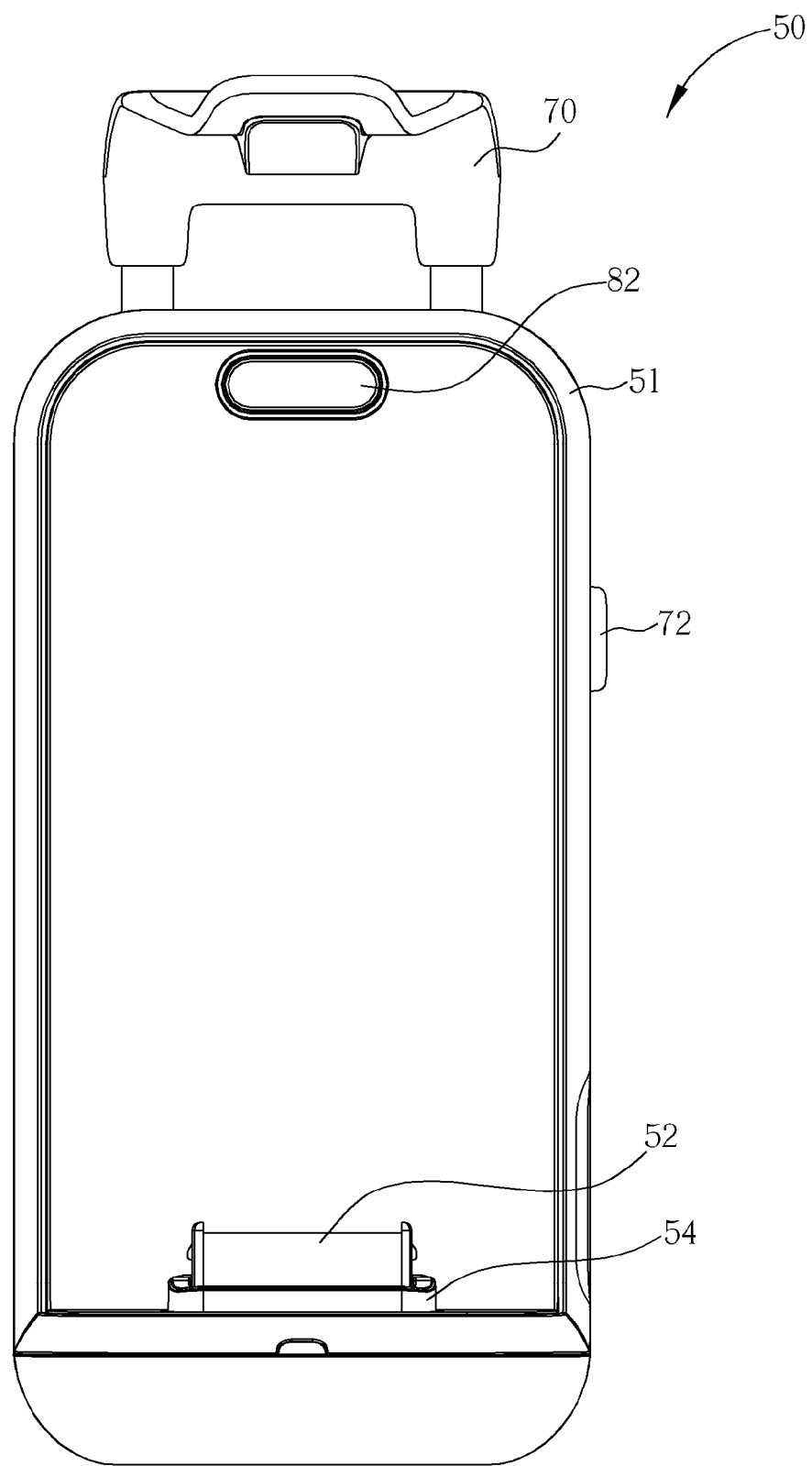
Figure 9:
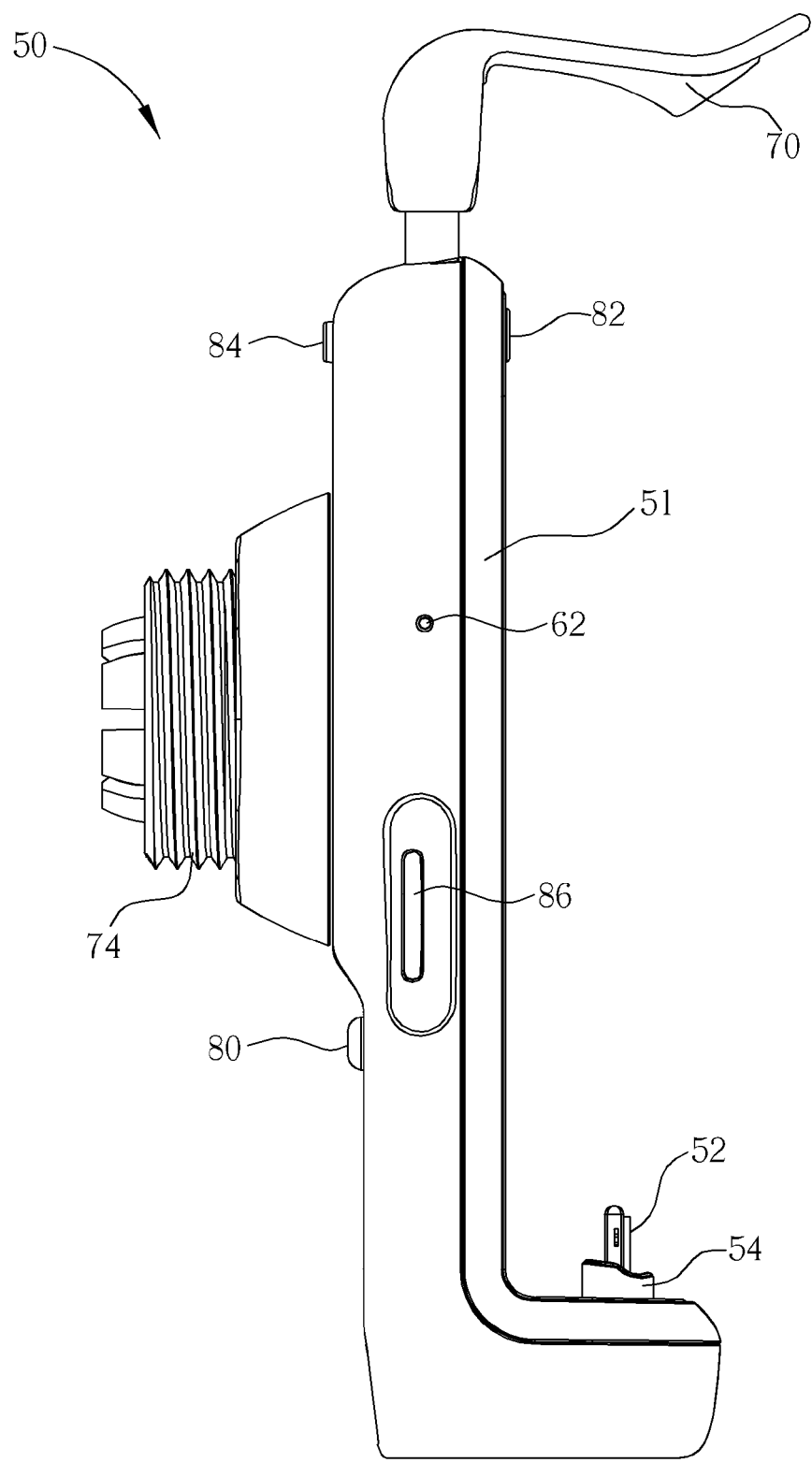
Figure 10:
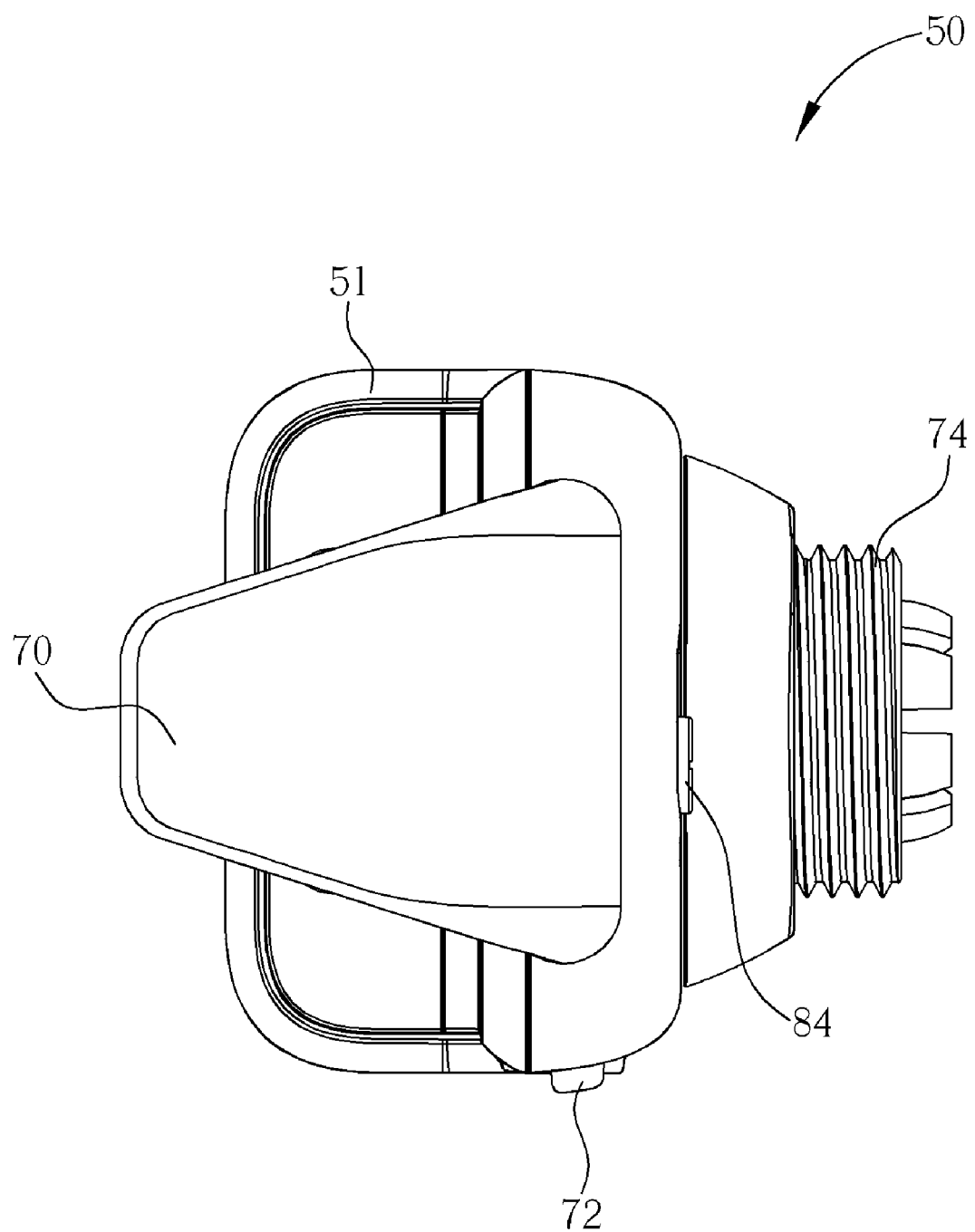

Please refer to FIGS. 1-10. FIG. 1 is a top-front perspective view of the cradle 50 according to the present invention. FIGS. 2-5 show a top-rear perspective view, a bottom-rear perspective view, a bottom-front perspective view, and a bottom view of the cradle 50, respectively. FIGS. 6-10 show a rear view, a right view, a front view, a left view, and a top view of the cradle 50, respectively.

In this disclosure, the front of the cradle 50 is defined as the portion of the cradle 50 where a mobile phone or other portable electronic device is placed into the cradle 50. The cradle 50 contains a connector 52 formed on the bottom portion of the front of housing 51 of the cradle 50 for receiving the mobile phone. The connector 52 links together with and electrically communicates with a connector of the mobile phone. The connector 52 is surrounded by bottom support 54, which serves to support the bottom of the mobile phone when the connector of the mobile phone links with the connector 52.

The connector 52 is a male electrical connector, and should protrude from the housing 51 with a length that is sufficient in order to make contact with a female electrical connector of the mobile phone. Preferably, a length with which the connector 52 protrudes from the housing 51 of the cradle 50 is greater than a depth of the female electrical connector of the mobile phone. Some extra length should be added to the connector 52 because the mobile phone may have a protective cover formed around the outer surface of the mobile phone, such as a rubber cover. Although the protective cover would increase the dimensions of the surface of the mobile phone, the connector 52 is narrow enough that it will not be hindered by the protective cover of the mobile phone, and it will still be able to fully insert into the female electrical connector of the mobile phone to ensure proper electrical contact. Furthermore, even if the mobile phone is fitted with a protective cover, the bottom support 54 is thin enough to ensure that both the connector 52 and the bottom support 54 can insert into a hole in the bottom of the protective cover that corresponds to the location of the female electrical connector of the mobile phone. Thus, the bottom support 54 supports some of the weight of the mobile phone while not hindering the electrical connection between the connector 52 and the female electrical connector of the mobile phone.

In an embodiment, the mobile phone is an iPhone® made by Apple®, in which case the connector 52 would also be compatible with other Apple® portable electronic devices such an iPod® or iPod Touch®. If the mobile phone is a device containing restrictions on which accessories can be used with the mobile phone, as the iPhone® contains, then the cradle 50 must contain a proper authentication chip for verifying that the cradle 50 is approved for use with the mobile phone. Of course, the connector 52 and the internal circuitry of the cradle 50 can be designed to be compatible with a wide variety of phones and other portable electronic devices, and is not limited to being compatible only with Apple® products.

A top clamp 70 secures the top of the mobile phone in place, preventing the mobile phone from moving up and away from the connector 52. A protruding support 82 protrudes from the housing 51 of the cradle 50 for preventing the phone from shaking while installed in the cradle 50. The connector 52, the top clamp 70, and the protruding support 82 provide three points retention for the mobile phone for securely positioning the mobile phone in the cradle 50, although the cradle 50 could use more than three points of retention as well. The protruding support 82 is preferably made out of a material that is both soft and has a high coefficient of friction, such as rubber. However, the protruding support 82 is not limited to being made out of rubber, and a variety of other materials can be used as well. Preferably, materials that do not scratch the surface of the mobile phone should be used.

A height-adjust release button 72 is formed on the right side of the housing 51, and when pressed, the height-adjust release button 72 allows the top clamp 70 to be raised for allowing the mobile phone to be inserted into or released from the cradle 50. The top clamp 70 can be lowered by applying a small amount of pressure on the top clamp 70, and pressing the height-adjust release button 72 is not necessary in order to lower the height of the top clamp 70. More explanation regarding the structure and operation of the top clamp 70 will be given below. Similarly, the degree to which the protruding support 82 protrudes from the housing 51 can be controlled by protruding adjuster 84 formed on the back of the housing 51. Moving the protruding adjuster 84 left or right controls how much the protruding support 82 protrudes out from the housing 51 in order to ensure that the protruding support 82 has a tight fit against the mobile phone.

A threaded mount 74 can be used for mounting the cradle 50 on an external mounting device, which allows the cradle 50 to be positioned in a variety of places, such as being attached to the inner surface of the windshield of a vehicle. Audio output port 76 allows the sound to be output to a device such as headphones or stereo system of the car instead of outputting sound through a speaker 66 of the cradle located at the bottom of the housing 51. The audio output port 76 may be a standard 3.5 mm headphone jack or any other port. The speaker 66 is installed in a speaker chamber formed in the bottom of the housing 51, and the speaker chamber is designed to have optimal acoustic properties.

Power can be supplied to the cradle 50 through power port 78. For convenience, the power port 78 may be a standard port such as a mini-Universal Serial Bus (mini-USB) port. A power cable can have a mini-USB plug on one end and a standard car cigarette lighter plug on the other end for receiving power from the 12V cigarette lighter socket in a car. Once power is supplied to the cradle 50 through the power port 78, the received power can be used to charge the mobile phone via the connector 52 of the cradle 50 and the connector 22 of the mobile phone.

A volume adjuster knob 86 is located on the left side of the housing 51 for allowing the user to adjust the volume of sound output through the speaker 66 or the audio output port 76. If for some reason, a Bluetooth connection between a Bluetooth transceiver of the cradle 50 and a Bluetooth transceiver of the mobile phone is disrupted, the user can press a Bluetooth reset button 80 located on the back of the housing 51 in order to try and reestablish the Bluetooth connection. When using the cradle 50 as a Bluetooth device for providing a speakerphone function for the mobile phone, the user may speak into a microphone 62 located on a left side of the housing 51, and listen to sound output through either the speaker 66 or the audio output port 76.

Figure 11:
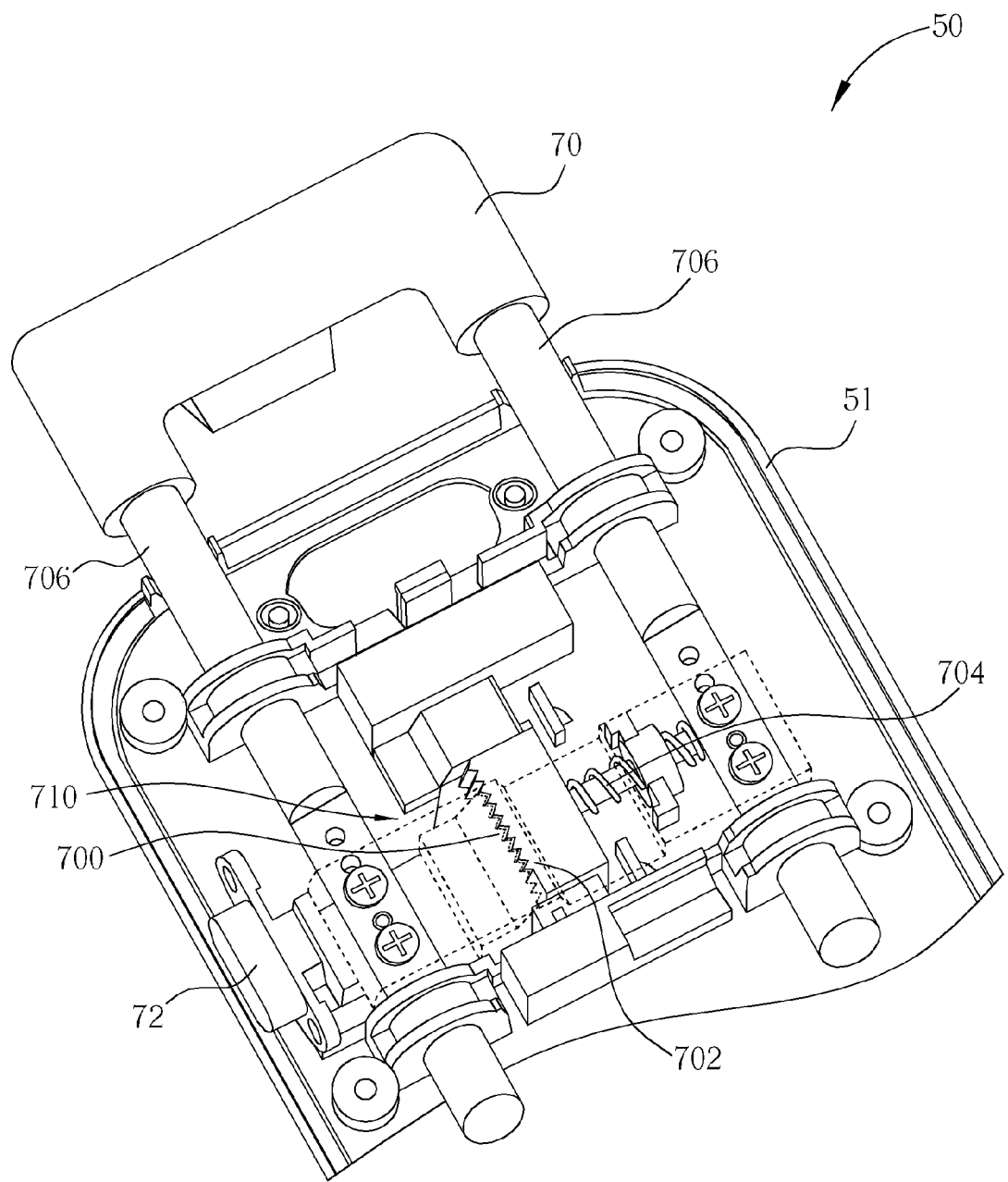
FIG. 11 shows an embodiment of a detailed diagram of the structure of the top clamp and its interaction with the height-adjust release button.

Please refer to FIG. 11. FIG. 11 shows an embodiment of a detailed diagram of the structure of the top clamp 70 and its interaction with the height-adjust release button 72. The top clamp 70 contains a pair of legs 706 slidably installed in the housing 51 of the cradle 50. The legs 706 can rise up and down in the housing 51, and the movement of the legs 706 is restricted by a ratchet 710 containing a first set of teeth 700 and a second set of teeth 702, which acts as a pawl for limiting the movement of the first set of teeth 700. The second set of teeth 702 permits the first set of teeth 700 to move in a downward direction, but prevents the first set of teeth 700 from moving in an upward direction.

When the height-adjust release button 72 is actuated by being pressed, the second set of teeth 702 is moved away from the first set of teeth 700, thereby allowing the first set of teeth 700 and the legs 706 of the top clamp 70 to rise upward. When the height-adjust release button 72 is released and no longer being actuated, a spring 704 urges the second set of teeth 702 back toward the first set of teeth 700, thereby preventing the first set of teeth 700 and the top clamp 70 from rising any further. In other words, the second set of teeth 702 acts as a spring-loaded pawl for restricting the movement of the first set of teeth 700.

Figure 12:
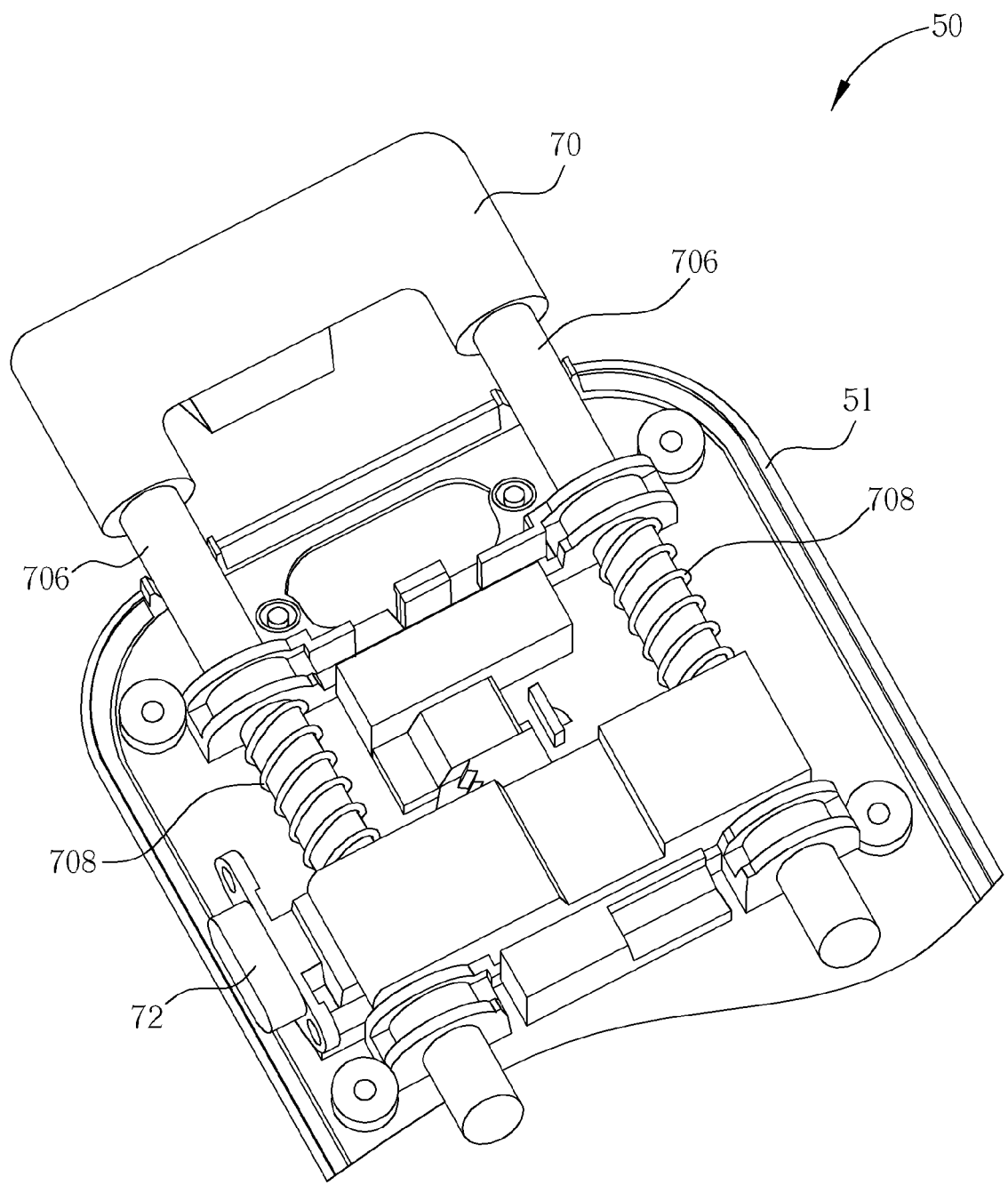
FIG. 12 shows another embodiment of a detailed diagram of the structure of the top clamp and its interaction with the height-adjust release button.

Please refer to FIG. 12. FIG. 12 shows another embodiment of a detailed diagram of the structure of the top clamp 70 and its interaction with the height-adjust release button 72. Differing from the embodiment shown in FIG. 11, the legs 706 have springs 708 wrapped around them for urging the legs 706 and the top clamp 70 upward when the height-adjust release button 72 is actuated. As the height-adjust release button 72 is actuated, the second set of teeth 702 are moved away from the first set of teeth 700, and the springs 708 automatically move the first set of teeth 700 and the legs 706 of the top clamp 70 upward. In this way, the spring 708 eliminates the need for the user of the cradle 50 to lift the top clamp 70 after actuating the height-adjust release button 72.

In summary, the present invention cradle 50 can make contact with the mobile phone or other portable electronic device at the top clamp 70, the protruding support 82, and the connector 52, thereby securely retaining the mobile phone installed in the cradle with three-point retention. Moreover, both the top clamp 70 and the protruding support 82 are adjustable, increasing the versatility of the cradle 50 for working with a variety of different types of mobile phones or other portable electronic devices. The cradle is adaptable enough to accommodate portable electronic devices of different dimensions while still retaining the portable electronic device in the cradle securely.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A cradle for receiving a portable electronic device installed in the cradle, the cradle comprising:
    a housing;
    a top clamp slidably installed in the housing for permitting the top clamp to move up and down in the housing, the top clamp securing a top of the portable electronic device when the portable electronic device is installed in the cradle, and the portable electronic device making contact with the housing at two or more points for securing the portable electronic device within the cradle, the top clamp comprising at least one leg slidably installed in the housing for moving the top clamp up and down with respect to the housing; and
    a height-adjust release button installed on the housing for permitting the top clamp to be raised when the height-adjust release button is actuated, wherein adjustment of the height of the top clamp is controlled by a ratchet, the ratchet comprising a set of teeth fixed to the leg and a spring-loaded pawl engaging with the set of teeth such that the leg of the top clamp is permitted to be lowered and is prevented from being raised when the spring-loaded pawl engages the set of teeth.

2. The cradle of claim 1, wherein the height-adjust release button separates the set of teeth from the spring-loaded pawl when the height-adjust release button is actuated, thereby permitting the top clamp to be raised.

3. The cradle of claim 2, wherein the leg of the top clamp has a spring wrapped around it for urging the leg upward, thereby urging the top clamp upward and raising the top clamp when the height-adjust release button is actuated.

4. The cradle of claim 1, further comprising:
    a protruding support installed on a front of the housing and protruding out from the front of the housing for supporting a back side of the portable electronic device when the portable electronic device is installed in the cradle; and
    a protruding adjuster installed on the housing for adjusting the degree to which the protruding support protrudes out of the housing.

5. The cradle of claim 1, further comprising a speaker chamber installed in the housing for enclosing a speaker of the cradle.

6. The cradle of claim 1, further comprising a male electrical connector formed on the housing for receiving a female electrical connector of the portable electronic device and establishing electrical connection between the male electrical connector and the female electrical connector when the portable electronic device is mounted in the cradle.

7. The cradle of claim 6, wherein the male electrical connector is formed on the bottom of the housing, and the cradle further comprises a bottom support surrounding the male electrical connector for supporting the portable electronic device when the female electrical connector of the portable electronic device establishes electrical connection with the male electrical connector.

8. The cradle of claim 7, wherein the bottom support is made out of rubber material.

9. A cradle for receiving a portable electronic device installed in the cradle, the cradle comprising:
    a housing;
    a male electrical connector formed on the housing for receiving a female electrical connector of the portable electronic device and establishing electrical connection between the male electrical connector and the female electrical connector when the portable electronic device is mounted in the cradle, wherein the portable electronic device makes contact with the housing at two or more points for securing the portable electronic device within the cradle;
    a top clamp slidably installed in the housing for permitting the top clamp to move up and down in the housing, the top clamp securing a top of the portable electronic device when the portable electronic device is installed in the cradle, the top clamp comprising at least one leg slidably installed in the housing for moving the top clamp up and down with respect to the housing; and
    a height-adjust release button installed on the housing for permitting the top clamp to be raised when the height-adjust release button is actuated, wherein adjustment of the height of the top clamp is controlled by a ratchet, the ratchet comprising a set of teeth fixed to the leg and a spring-loaded pawl engaging with the set of teeth such that the leg of the top clamp is permitted to be lowered and is prevented from being raised when the spring-loaded pawl engages the set of teeth.

10. The cradle of claim 9, wherein the height-adjust release button separates the set of teeth from the spring-loaded pawl when the height-adjust release button is actuated, thereby permitting the top clamp to be raised.

11. The cradle of claim 10, wherein the leg of the top clamp has a spring wrapped around it for urging the leg upward, thereby urging the top clamp upward and raising the top clamp when the height-adjust release button is actuated.

12. The cradle of claim 9, further comprising:
    a protruding support installed on a front of the housing and protruding out from the front of the housing for supporting a back side of the portable electronic device when the portable electronic device is installed in the cradle; and a protruding adjuster installed on the housing for adjusting the degree to which the protruding support protrudes out of the housing.

13. The cradle of claim 9, further comprising a speaker chamber installed in the housing for enclosing a speaker of the cradle.

14. The cradle of claim 9, wherein the male electrical connector is formed on the bottom of the housing, and the cradle further comprises a bottom support surrounding the male electrical connector for supporting the portable electronic device when the female electrical connector of the portable electronic device establishes electrical connection with the male electrical connector.

15. The cradle of claim 14, wherein the bottom support is made out of rubber material.

16. A cradle for receiving a portable electronic device installed in the cradle, the cradle comprising:

a housing;

a top clamp slidably installed in the housing for permitting the top clamp to move up and down in the housing, the top clamp securing a top of the portable electronic device when the portable electronic device is installed in the cradle, and the portable electronic device making contact with the housing at two or more points for securing the portable electronic device within the cradle;

a protruding support installed on a front of the housing and protruding out from the front of the housing for supporting a back side of the portable electronic device when the portable electronic device is installed in the cradle;

a protruding adjuster installed on the housing for adjusting the degree to which the protruding support protrudes out of the housing; and a height-adjust release button installed on the housing for permitting the top clamp to be raised when the height-adjust release button is actuated.

17. A cradle for receiving a portable electronic device installed in the cradle, the cradle comprising:

a housing;

a protruding support installed on a front of the housing and protruding out from the front of the housing for supporting a back side of the portable electronic device when the portable electronic device is installed in the cradle;

a protruding adjuster installed on the housing for adjusting the degree to which the protruding support protrudes out of the housing; and a male electrical connector formed on the housing for receiving a female electrical connector of the portable electronic device and establishing electrical connection between the male electrical connector and the female electrical connector when the portable electronic device is mounted in the cradle, wherein the portable electronic device makes contact with the housing at two or more points for securing the portable electronic device within the cradle.

* * * * *